US006775356B2

(12) United States Patent
Salvucci et al.

(10) Patent No.: US 6,775,356 B2
(45) Date of Patent: Aug. 10, 2004

(54) REAL-TIME INCIDENT AND RESPONSE INFORMATION MESSAGING INA SYSTEM FOR THE AUTOMATIC NOTIFICATION THAT AN EMERGENCY CALL HAS OCCURRED FROM A TELECOMMUNICATION DEVICE

(76) Inventors: Angelo Salvucci, 1679 Franceschi Rd., Santa Barbara, CA (US) 93103; Don E. Reich, 2420 Stafford Rd., Lake Sherwood, CA (US) 91361; Kurt E. Warner, 203 Rincon Point Rd., Carpinteria, CA (US) 93013; William C. Cook, 5506 Colbath Ave., Van Nuys, CA (US) 91401

( * ) Notice: Subject to any disclaimer, the term of this patent is extended or adjusted under 35 U.S.C. 154(b) by 293 days.

(21) Appl. No.: 09/967,291

(22) Filed: Sep. 27, 2001

(65) Prior Publication Data

US 2002/0057764 A1 May 16, 2002

Related U.S. Application Data

(63) Continuation-in-part of application No. 09/712,660, filed on Nov. 30, 2000.

(51) Int. Cl.[7] .............................................. H04M 11/04
(52) U.S. Cl. .............................. 379/49; 379/45; 379/48
(58) Field of Search ......................... 379/37–51, 201.01, 379/211.01; 455/404.01, 404.02; 701/45

(56) References Cited

U.S. PATENT DOCUMENTS

| 5,388,147 | A | * | 2/1995 | Grimes | .................... | 455/404.2 |
| 5,805,670 | A | * | 9/1998 | Pons et al. | .................... | 379/45 |
| 6,076,028 | A | * | 6/2000 | Donnelly et al. | ............. | 701/45 |
| 6,151,385 | A | * | 11/2000 | Reich et al. | .................. | 379/49 |
| 6,201,856 | B1 | * | 3/2001 | Orwick et al. | ................ | 379/40 |

* cited by examiner

Primary Examiner—Wing Chan
(74) Attorney, Agent, or Firm—Owen L. Lamb (57) ABSTRACT

An emergency call initiated from a wireline or wireless device is recognized at a point along a network path and an alert signal is generated. Additional information including real-time incident and response information is collected in response to the alert signal. The emergency call is associated with the additional information separate from information in the emergency call. A call is then automatically placed to a telephone number designated by the subscriber, the call including the additional information. The real-time incident and response information includes the location of the calling device, and one or more of incident specific information, person specific information, and vehicle specific information.

28 Claims, 5 Drawing Sheets

REAL-TIME INCIDENT AND RESPONSE INFORMATION MESSAGING INA SYSTEM FOR THE AUTOMATIC NOTIFICATION THAT AN EMERGENCY CALL HAS OCCURRED FROM A TELECOMMUNICATION DEVICE

CROSS-REFERENCE TO RELATED APPLICATIONS

This application is a continuation-in-part of application Ser. No. 09/712,660 filed Nov. 30, 2000 of Salvucci, et al. titled "Real-Time Response Information Messaging In A System For The Automatic Notification That An Emergency Call Has Occurred", which application is incorporated herein by reference.

TABLE OF CONTENTS 1.0 BACKGROUND OF THE INVENTION
  1.1 Field of the Invention
  1.2 Description of the Prior Art
2.0 SUMMARY OF THE INVENTION
3.0 BRIEF DESCRIPTION OF THE DRAWINGS
4.0 DETAILED DESCRIPTION OF THE INVENTION
  4.1 Overview of the Invention
  4.2 First Embodiment (Wireline Devices)
  4.3 Second Embodiment (Wireless Devices)
  4.4 Subscriber Registration
  4.5 Alert Signal Origination
    4.5.1 Automatic Location Identification (ALI) Database System Query
    4.5.2 Advanced Intelligent Network (AIN) Trigger
    4.5.3 Wireless Network
      4.5.3.1 PSTN 911
      4.5.3.2 Cell Tower/Sector Routing
      4.5.3.3 Handset-location based routing
        4.5.3.3.1 Call-Path Associated Signaling (CAS)
        4.5.3.3.2 Non Call-Path Associated Signaling (NCAS)
        4.5.3.3.3 Hybrid Systems
        4.5.3.3.4 Third-party Location
    4.5.4 IP Telephony
  4.6 Real-time Data Acquisition
    4.6.1 Voice Recording Transmission
    4.6.2 Computer-Assisted Dispatch (CAD) Information Transmission
    4.6.3 Automatic Crash Notification (ACN) Database
  4.7 Notification
    4.7.1 Notification Menu Flow
    4.7.2 Attach Associated Information
    4.7.3 Notification Mode
5.0 SUMMARY
CLAIMS
ABSTRACT OF THE DISCLOSURE

1.0 BACKGROUND OF THE INVENTION

1.1 Field of the Invention

This invention relates to telecommunication networks and more particularly, to a method of third-party notification which responds whenever a call to an emergency service has occurred by placing real-time incident and response information content into an outbound notification call to a list of predetermined telephone numbers.

1.2 Description of the Prior Art

Nationwide, a non-toll telephone number 9-1-1 has been designated for calls relating to emergencies that threaten human life or property. Similar telephone numbers have been designated in many foreign countries. The calls are directed by the telephone company's End Office/Central Office (CO) and 9-1-1 Tandem to a Public Safety Answering Point (PSAP) where the calling number Automatic Number Identification (ANI) is displayed on a viewing screen. Most areas now have "Enhanced 9-1-1" which allows selective routing and through which both the calling number and address of the caller are displayed on a viewing screen at the PSAP, thus enabling the emergency agency to locate the caller if the call is interrupted. The address of the caller is obtained from the telephone company's customer records Automatic Location Identification (ALI) database system. Currently mobile communications systems, such as cell phones, low earth orbit (LEO) satellite phones, wireless IP devices, etc. do not provide a way for a Public Safety Answering Point (PSAP) to determine the actual physical location or address (the street address or coordinates) where the device is located. This has been identified as a major obstacle in providing the enhanced 9-1-1 features for wireless cell phones, one of the key elements of which is locating the caller.

Personnel at the PSAP talk to the caller and route the call to the appropriate agency equipped to handle the emergency, such as ambulance; fire and rescue; police, sheriff and highway patrol; or Coast Guard, Search and Rescue. Third parties, other than the agency responding to the emergency, may also be notified that a 9-1-1 call has been placed. Prior approaches to call notification and/or routing are represented by the following prior art patents:

Carrier, et. al., U.S. Pat. No. 5,195,126, granted Mar. 16, 1993, for "Emergency Alert and Security Apparatus and Method" discloses a wireline telecommunications system which includes a 9-1-1 and voice message service platform for providing such services as telephone answering, voice mail and call completion. An emergency/safety notification system includes a monitor/router device passively connected to the 9-1-1 Tandem to detect number identification signals. In the event of a 9-1-1 telephone call, the service initiates a voice mail call, which plays a custom message from the calling party to designated third parties. The Carrier patent does not provide for the automatic insertion of the calling party's ANI, the date or the time of the 9-1-1 call, or the name or location or address of the telephone customer. The service is driven from a passive monitor/router at every 9-1-1 Tandem or End/Central Office. The service provides only voice mail in the event of a 9-1-1 call. If no voice mail message is provided by the subscriber, no message is played in the event of a 9-1-1 call.

Pons, et. al., U.S. Pat. No. 5,805,670, granted Sep. 8, 1998, for "Private Notification System for Communicating 9-1-1 Information" discloses an advanced personal safety service that is connected directly to 9-1-1 call centers. To activate the service, subscribers complete a questionnaire providing personal information about their location and household and pay a monthly fee. When a subscriber dials 9-1-1 for help and the call is answered at the PSAP, Automatic Number Identification/Automatic Location Identification (ANI/ALI) data is sent from the E-9-1-1 Controller to a Command Control Center. If the Command Control Center determines the ANI is one of a subscriber, it sends personal information to the PSAP CAD, and the CAD may send information about the incident to the Command Control Center. Police, fire and emergency medical services are provided with personal information about subscribers, such as medical history and preexisting conditions, as well as the location of children, elderly or infirm persons within a dwelling. The Command Control Center personnel may place calls to a preselected list of telephone numbers. The information given to the pre-selected recipients may include response or destination information from the CAD. Thus, the service provides emergency services with personal information about subscribers and alerts pre-selected contacts about the incident.

Reich, et al., U.S. Pat. No. 6,151,385 assigned to the assignee of the present invention describes a computer driven telecommunication system that automatically reacts to all emergency 9-1-1 calls that result in a query to the local telephone company's Automatic Location Identification (ALI) database system. This query may come from a tandem selective router, a 9-1-1 controller, a service control point, or other source of an Automatic Number Identification (ANI). Reaction is based on the Automatic Number Identification (ANI) as provided to the system by the local telephone company through a connection from the ALI database system. Reaction to the input includes evaluation of all ANIs to determine if the ANI is for a customer that has subscribed to the system and, pending positive evaluation, reacting through existing telephone networks by notifying addressable communication devices that a 9-1-1 call has been placed from the subscriber's telephone.

Orwick, et al. U.S. Pat. No. 6,201,856, granted Mar. 13, 2001, for "Emergency telephone call notification service system and method" describes a method for emergency telephone call notification for use in a wireline network. The system includes an advanced intelligent network (AIN) capable switch, a service control point (SCP) having a database of designated contact numbers associated with a service subscriber telephone number, and an intelligent peripheral in communication with the SCP for contacting the designated contact numbers. The method recognizes an N11 trigger at the switch in communication with the subscriber telephone (e.g. a dialed 911 call) in response to which the SCP initiates telephone calls, via the intelligent peripheral, to each of the contact numbers corresponding to the telephone number of the subscriber making the emergency telephone call.

The intelligent peripheral supplies a caller ID message to the designated telephone number and plays a prerecorded message if a person answers the emergency call notification call. The system employs a caller ID generator comprising a pre-designated message stored in memory. The intelligent peripheral further comprises a plurality of prerecorded message templates, for example, a prerecorded message for transmission to an answering machine. Each of the templates may have a general voice or text message for transmission to the contact telephones. If a response (touch tone or voice) is received from a person answering at the contact number dialed by the intelligent peripheral, the intelligent peripheral may play an announcement indicating that the emergency call was placed from the subscriber telephone at a particular time/day, and will automatically attempt to connect the person answering the notification call to the subscriber telephone.

The service is provided entirely within the telephone company's network—information is not sent to an independent third party notification service.

Pickett, et al. U.S. Pat. No. 5,761,278, granted Jun. 2, 1998 for "Integrated data collection and transmission for 9-1-1 calls for service" discloses a method to provide, in a wireline telephone system,: 1) the ability to capture and utilize decoded caller data; 2) automatically interrogate one or more computer databases using caller data (telephone number) as a search key: 3) integrate and format the caller information as it is returned by the database search. Such information could include the address of the caller, the geopolitical jurisdiction information (e.g., the police, fire, or ambulance service responsible for a particular geographic area), and the ability to integrate this information plus any additional information provided by the call taker; 4) automatically transmit the integrated data via a leased or a dial up telephone line to a radio common carrier such as a paging service for broadcast to the end-user. The data comprises the telephone number of the calling party, the calling party's name, the calling party's address, the time of day, and the date of the call, and additional information input into the computer by a call taker at the central site.

The computer uses the calling party identification (ANI) to query one or more databases. The first database queried is the telephone company Data Management System or ALI (automatic location identification) database. Results from each database search are then merged with call taker input, for example free text comments, formatted and then transmitted to a radio common carrier (RCC) or paging company. The radio common carrier prioritizes the data and sends it to their broadcast towers where the data is then broadcast via RF (radio frequency). The broadcast data is received and decoded by an alphanumeric message receiver.

Once the calling party identifier or automatic number identification (ANI) has been decoded and presented to the computer, a query is made to the Data Management System or ALI (Automatic Location Identification) Database. Returned from that database is the ALI which includes, but is not limited to the following fields: (1) the calling party identifier or ANI; (2) the address, including the block number, street name, sub address such as apartment, trailer, suite, and the city and state; (3) the time of day and the date of the call; (4) the caller's class of telephone service such as residential, business, PBX or mobile; (5) the Emergency Service Number (ESN) which is a three digit code that can represent a geopolitical jurisdiction; (6) the subscriber's name; and (7) the billing telephone number. Also available for inclusion is any comments that the call taker wishes to insert such as "caller unable to speak, possibly choking" or "disturbance" or "fire reported at this address." This information may be integrated with additional information entered by the call taker such as the nature of the incident and whether it's critical or non-critical.

None of the prior art provide for communicating emergency telephone call notices to designated parties that includes real-time information about the incident or emergency that is being reported, collected within an interval between a time that the emergency call is recognized and a response is initiated, automatically and immediately while the incident is being reported.

Accordingly, there is a need for an improved system and method of communicating emergency telephone call notices to designated parties that provides real-time information about the incident or emergency that is being reported, automatically, with or without human intervention. This will ensure that information about the content of an emergency call is made available to notified parties automatically whether or not a call taker that answers takes action with respect to the emergency call.

An important advantage is that designated parties are notified that a 9-1-1 call has been placed, even though it may not have been answered or responded to by emergency personnel. This is a very useful and unique feature because even when personnel are too busy to act after answering a 9-1-1 call a notified party is informed not only that the call was placed but also the nature of the call.

It is desirable to provide a method of using one or more of the ANI, Time, and Date or other unique identifying information to search an emergency response database, transferring information from the emergency response or other database to an emergency service notify database, and incorporating the information into the outgoing notify message.

It is desirable to provide a system that will detect a call to an emergency service that is initiated from a mobile communications device and respond with an automatic notification that the call has occurred and supply real-time incident and response information.

It is desirable to be able to offer to the recipient of the notification call more information upon which to make a decision on how to respond.

It is desirable to provide a notification service that can detect emergency calls from a wireless phone regardless of whether the ALI database is queried in the processing of the call.

2.0 SUMMARY OF THE INVENTION

Briefly, the invention relates to a method of searching an emergency response database, transferring information from the emergency response or other database to an emergency service notify database, and incorporating the information into the outgoing notify message. The invention is a computer driven telecommunications system that automatically responds to all wireline or wireless emergency 9-1-1 calls, including wireline and wireless Internet Protocol (IP) emergency 9-1-1 calls.

Wireline calls result in a query to the local telephone company's Selective Routing/Automatic Location Identification (ALI) database system. This query may come from a tandem selective router, a 9-1-1 controller, a service control point, or other source of an Automatic Number Identification (ANI). An emergency call initiated from a mobile communications (wireless) device is recognized by an alert signal origination mechanism at a point somewhere along a network path.

In either wireline or wireless calls, additional information including real-time information about the incident that is being reported is collected within an interval between a time that the emergency call is recognized and a response is initiated. The emergency call is associated with the additional information. A notify call is then automatically placed to a telephone number designated by the subscriber, the notify call including the additional information.

In accordance with an aspect of the invention, the real-time incident and response information includes the location of the mobile communications device from the location system (for wireless calls), and one or more of incident-specific information, person-specific information, and vehicle-specific information.

There are four main components: Registration, Alert Signal Origination, Real-Time Data Acquisition and Notification.

Registration may be through the local telephone company, or directly to the 9-1-1 Notify System, or a combination of both. During the registration mode, a telephone customer registers their telephone number with other unique identifying information as needed, and telephone number(s) to be notified upon the occurrence of 9-1-1 call originating at the subscriber's telephone. The cost of the service appears on the subscriber's telephone bill or by direct mailing by the notify service. Thus, only those telephone customers that have subscribed to the service will have information transmitted to designated notify telephone numbers. Registration via the local telephone company requires scheduled downloading of a data packets for each registrant to the system's master subscriber database.

Alert Signal Origination includes ANI from the ALI database system query, Advanced Intelligent Network (AIN) triggers, wireless network events, and Internet Protocol (IP) calls. All ANIs or other unique identifying information are evaluated against the master subscriber database to verify account status.

If a positive evaluation is confirmed, Real-Time Data Acquisition occurs. The selective router or other voice-carrying device in an Advanced Intelligent Network, will be signaled to transfer the voice to a voice-recording device that will record the call. Additional information from a Computer-Assisted Dispatch device (CAD) associated with the call is obtained by database query. The information is stored for retrieval for use in the notification.

Notification is comprised of placing an outgoing connection to each subscriber's list of addressable communication devices to be notified under the terms of the system and placing either a computer generated voice or text message on the connection, informing the communication device that the subscriber has initiated a 9-1-1 call. The notification may contain prompts to access the additional CAD and voice-recording information.

Other components of the system include typical computer-generated options such as modification of addressable communication devices to be automatically connected, automatic testing of the notification process by the subscriber, help notifications and pricing information responses.

An advantage of the invention is that a voice recording allows an early, accurate notification of a third party when someone dials 9-1-1 from a subscriber phone. For example, the early accurate notification of a private security company when someone dials 9-1-1 from a protected phone or early, accurate notification of a campus security force when someone dials 9-1-1 from a campus phone.

3.0 BRIEF DESCRIPTION OF THE DRAWINGS

The invention will be described in greater detail with reference to the drawings in which.

4.0 DETAILED DESCRIPTION OF THE INVENTION 4.1 Overview of the Invention

The invention pertains to an automatic system for notifying designated communication devices that a 9-1-1 call has been placed, from either a wireline or wireless device. Advertisement of the 9-1-1 call notification service directs a prospective subscriber to call a local telephone provider to sign up for the service. During sign-up, the local telephone company may either obtain the addressable communication devices to be notified and supply the new subscriber a password for accessing the system's Interactive Voice Response (IVR) or customers may sign up with the telephone company and then from their phone select their own password. For future editing of the addresses the new subscriber is provided with a password to access the systems IVR directly, thus allowing the new subscriber to input and change the notify addresses directly. In either event, the telephone company provides a download of the subscriber's ANI and the associated notify numbers and/or the provided password to the 9-1-1 Notify System's main subscriber database by means of data packets periodically scheduled for downloading.

Access to the system's IVR is established via a voice telephony connection (toll free 800 or other) and/or an Internet address Web page. When a voice telephony call is received from a subscriber and the password is confirmed, the software proceeds with a voice answer-back menu allowing the subscriber to register new notify device addresses, edit/change existing notify device addresses, test the system without calling 9-1-1, etc. Subscribers sign up and/or register notify device addresses over the Internet by accessing the system's Internet Web page directly. Similar options offered through the IVR system are offered via the Internet-addressed on-line menu.

Subsequently, if a 9-1-1 call is placed from a subscriber telephony device that has previously been registered with the service, the software automatically assembles a notify message that includes previously stored data related to the calling device and additional real-time incident and response data and sends the message to each device on the subscriber's notify list. The notify message at least identifies the calling phone number, and the time and date of the call. If an answer is not confirmed, or the line is busy, the software turns on a "call later" tag associated with the notify number corresponding to the unconfirmed or uncompleted call. Periodically, the software services any tagged unconfirmed notify calls. For Internet or other one-way text or other devices, the notify information is sent in an appropriate format.

The following details the preferred methods for the implementation of the invention. It shall be understood by those familiar with the telecommunications field that actual implementation shall be predicated on the state of the relevant telephony/communication technology at the time of implementation of the invention and the level of involvement of the network telephony/communication service provider in the implementation of the invention.

4.2 First Embodiment (Wireline Devices)

Figure 1:
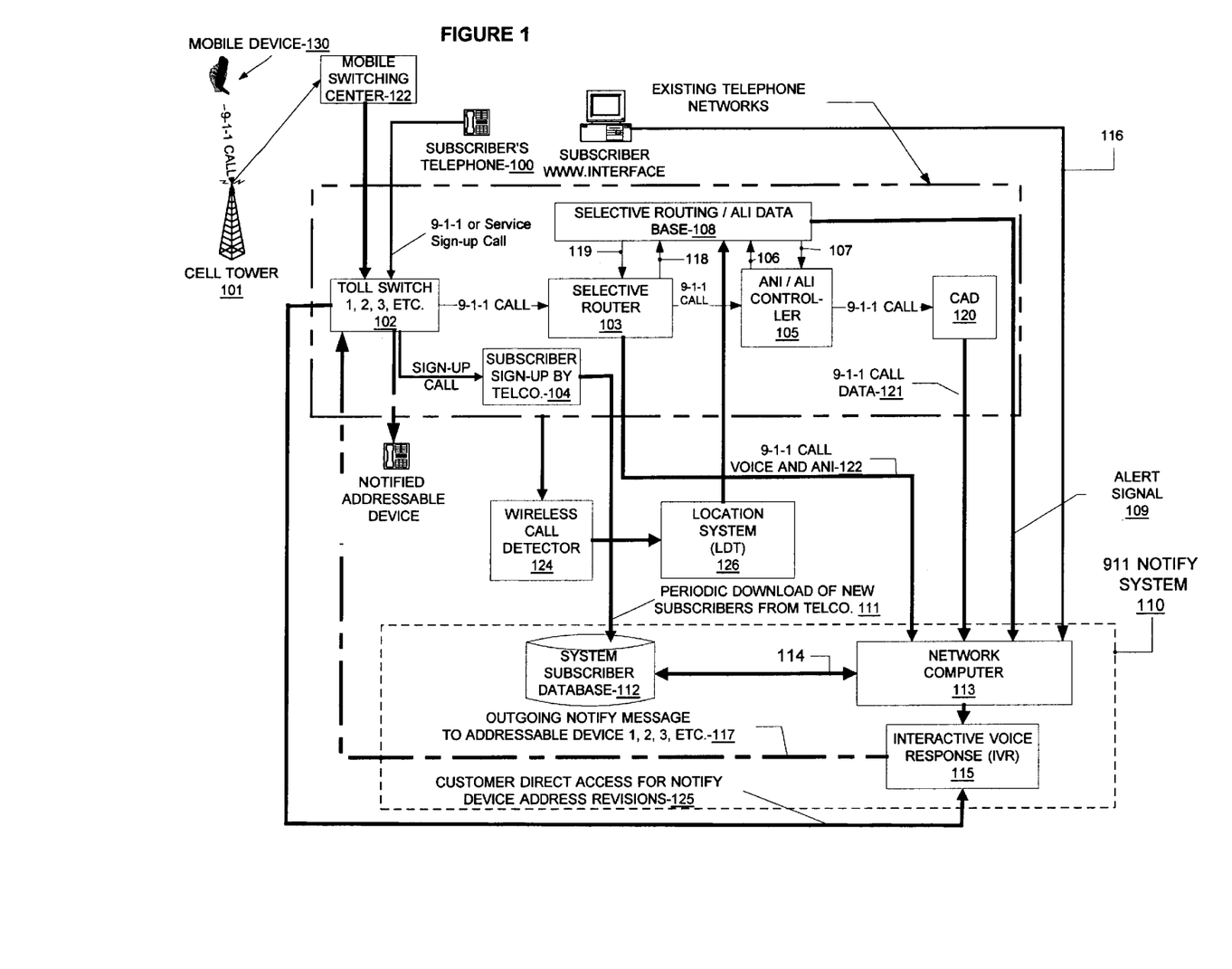
FIG. 1 is a block diagram of an existing inter-exchange network that provides 9-1-1 call services in which the present invention is embodied.

Refer to FIG. 1, which is a block diagram of an existing inter-exchange network that provides 9-1-1 call services in which the present invention is embodied. A typical network includes a number of interconnected toll switches and other telecommunication devices. Each toll switch may be any one of well-known types of switching equipment, such as, for example, the 5ESS of Lucent, or DMS-100 of Nortel. In a typical case, a toll switch is associated with a local Central Office (not depicted), which may include any number of toll switches. The Central Office (CO) connects a calling station (100) that has dialed a particular telephone number to an associated toll switch (102). In doing so, the CO sends to the toll switch calling information including the dialed (called) telephone number and telephone number of the calling station. A CO will also advance a telephone call received from its associated toll switch to an intended telephone station associated with that CO.

A subscriber (100) to the new service shall contact their local telephone provider (104) with the intent of registering for the service. The local telephone provider shall sign up the new subscriber and may provide the subscriber with a security code password for accessing the 9-1-1 Notify System (either by telephone or Internet) to register notify device addresses. This is accomplished by an existing process.

The local telephone provider shall supply the 9-1-1 Notify System (110) with "data packets" at regular intervals via modem or Internet connection (111). Each data packet shall include the ANI (and other unique identifying information if available) of the new subscriber, the password assigned to the new subscriber and accounting protocols as required. The data packets shall be disseminated and organized by the 9-1-1 Notify System into the System Subscriber Database (112). The method of transferring data packets exists.

Once the data packets are received and organized by the 9-1-1 Notify System, the new subscriber may access the system with the previously mentioned password via direct telephony IVR (115) or Internet access (116). Once accessed to the 9-1-1 Notify System, the new subscriber shall have the option of defining the addressable telephony communication devices (telephone, pager, PCS, email, fax, etc.), editing/deleting addressable devices, testing the system, etc.

When a 9-1-1 call is placed from a subscriber's telephone (100), the CO for the calling station routes the 9-1-1 call through a toll switch (102) to a 9-1-1 tandem selective router (103) which ascertains to which PSAP ANI/ALI Controller (105) the call should be routed. The exact routing of the 9-1-1 call to the selective router is by an existing process. The 9-1-1 tandem selective router (103) may query the providing telephone company's Automatic Location Identification (ALI) database system within the Selective Routing/ALI Database logic (108) for an Emergency Service Number (ESN) to be used for call routing.

At the PSAP, the call is received by a local controller module (105) and routed to the next available answering station. Simultaneously, if ALI information is not received from the 9-1-1 tandem selective router, the local controller module (105) in the PSAP initiates a query (106) to the providing telephone company's ALI system (108). The query, based on the original calling station's ANI, retrieves the address of the original calling station and other customer information from the ALI database system. The information is routed back (107) to the ANI/ALI Controller and displayed on a monitor screen at the answering station.

The response of the notify system is triggered from the Selective Routing/ALI database system query. The query may come from the 9-1-1 tandem selective router, the local controller module in the PSAP, Service Control Point in an advanced intelligent network, or other source. The ALI database system software transmits, in response to the ANI query, all of the ANIs querying the ALI system, and other information, to the 9-1-1 Notify System via dedicated telephony line.

The present invention may also be implemented by using an advanced intelligent network (AIN) infrastructure. An AIN consists of service switching points (SSPs) and service control points (SCPs), and control signals that are transported from Signal Transfer Points (STPs) through a signaling system 7 (SS7) network. An AIN has the capability of recognizing specific telephone numbers (such as 911) and generating a trigger. An existing process accomplishes this. An example is the Lucent Advanced Services Platform and 5ESS-2000.

The 911 Notify system would be connected to the SS7 network or other supporting network (such as an X.25 network connecting to a service management system) by means of a STP or other method and receive the trigger that the AIN has recognized a 9-1-1 call.

4.3 Second Embodiment (Wireless Devices)

A typical wireless network includes a cell tower (101), a Mobile Switching Center (MSC) (122) and a number of interconnected toll switches and other telecommunication devices. The MSC connects a mobile (wireless) communications device (130) that has dialed a particular telephone number to an associated toll switch (102). In doing so, the MSC sends to the toll switch calling information including the dialed (called) telephone number, other unique identifying information for that wireless device, and the telephone number of the wireless device.

Calls from a mobile communication device (wireless), such as a cell phone, low earth orbit (LEO) satellite phones, etc. are received at the cell tower (101) and transferred to a mobile switching center (MSC) (122). The MSC connects the call to the existing telephone network at the toll switch (102).

Figure 2:
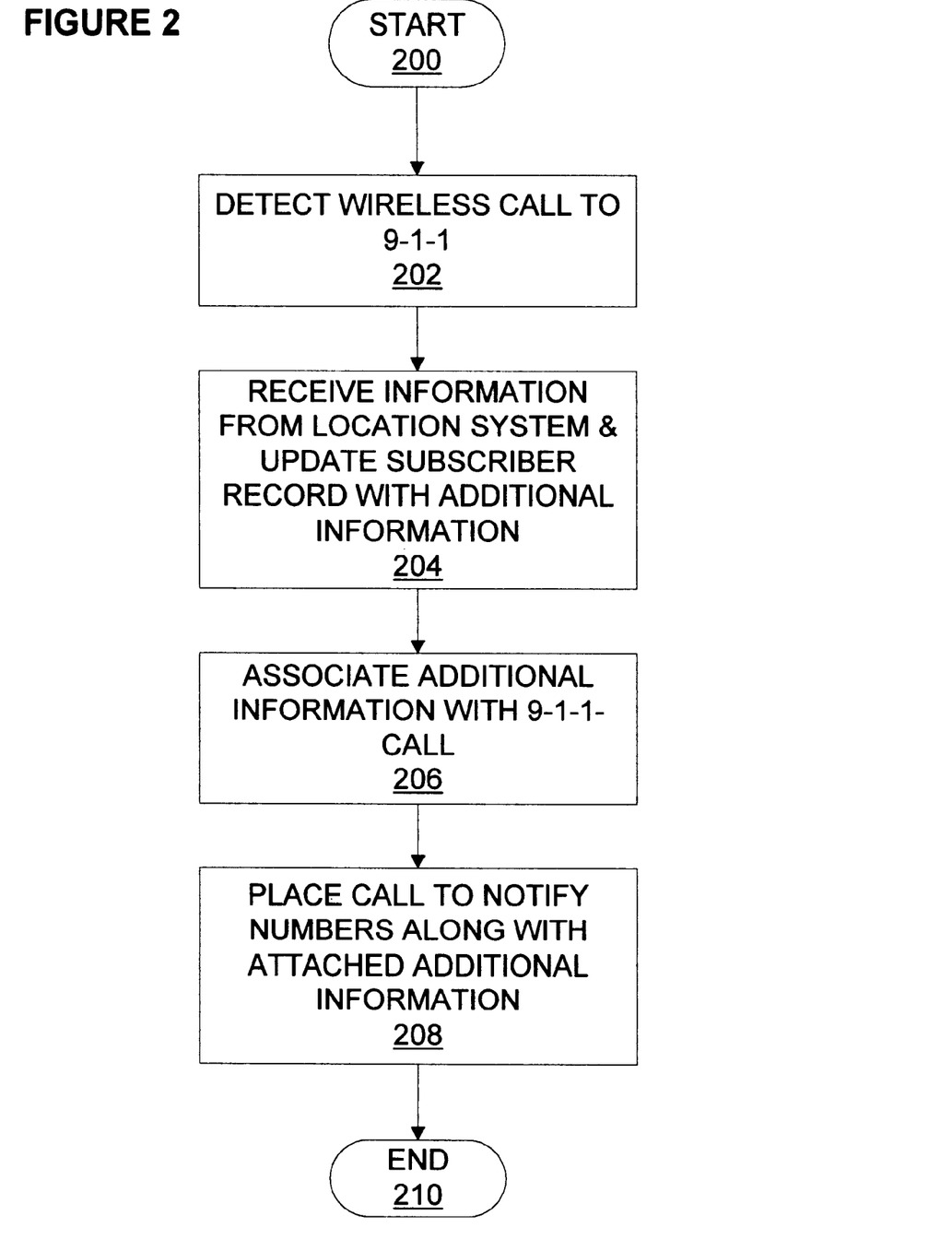
FIG. 2 is a flow diagram of a method of wireless calls of the present invention.

Refer to FIG. 2, which illustrates in flow chart form the principles of the computer programs that implement the present invention. The flow starts (200). An emergency call initiated from the wireless device is recognized (202) at an alert signal origination mechanism at a recognition point along the network path. Additional information, including real-time incident and response information, is received (204) and the subscriber record is updated with the additional information. The emergency call is associated with the additional information separate from information in the emergency call (206). A call is automatically placed to a telephone number designated by the subscriber, the call including the additional information (208). The real-time incident and response information includes the location of the wireless device from the location system (126, FIG. 1), and one or more of incident-specific information, person-specific information, and vehicle-specific information. The flow ends (210).

4.4 Subscriber Registration

The basic principles of the registration portion of the system are shown in flow chart form in U.S. Pat. No. 6,151,385. A new subscriber contacts their local telephone provider and registers for the notification service. The new subscriber is provided with a password by the local telephone provider, or may select their own, and instructed to contact the service provider's registration line to access the system and register the new subscriber's notify number(s). When a call is received at the system's registration line, the software decodes the automatic number identification (ANI). Next, the software searches the database for an entry for this ANI. If an entry is found, then the caller is calling from a number that is previously registered with their local telephone provider. The system continues with verification of the subscriber's password. If an entry is not found the system informs the user to enter a registered phone number and password or contact their local telephone provider to register with the service.

For confirmed subscribers, the software continues with the voice response registration menu subroutine. After return from the voice response registration menu subroutine, the software stores the notify numbers and specified languages in the System Subscriber Database for this ANI (subscriber). Thereafter, the registration mode ends.

4.5 Alert Signal Origination

4.5.1 ALI Database System Query

In this mechanism, the response of the notify system is triggered from the Selective Routing/ALI database system query. The query may come from the 9-1-1 tandem selective router, the local controller module in the PSAP, Service Control Point in an AIN, or other source. The ALI database system software transmits, in response to the ANI query, all of the ANIs querying the ALI system, and other information, to the 9-1-1 Notify system via dedicated telephony line or network connection (9). The incoming information packets from the ALI database system include at least the time and date of the query and the ANI used to initiate the query. Other information may be transmitted as well such as the name and address of the subscriber, the physical location of the subscriber if that information is available (such as from handset or network-based location determination technology) and the number of an information line.

Alternatively, the 9-1-1 tandem selective router, PSAP local controller module, Service Control Point in an AIN, or other source that queries the ALI database system also, at the same or nearly same time, transmits the ANI to the 9-1-1 Notify System.

All incoming ANIs (9) querying the ALI database system are compared to the System Subscriber Database (12). Reaction to negative matches results in "routing to ground" (i.e., deletion) of the particular ANI to which no match was found. Positive reaction (i.e., incoming ANI matched to existing ANI in the System Subscriber Database) results in the system accessing the matched subscriber's registration data record using a translation of the calling ANI as an index to a table.

4.5.2 Advanced Intelligent Network (AIN) Trigger

An AIN is able to recognize a 911 call and generate a trigger in response. Notification of this trigger, along with the originating ANI and other information, is sent to the 9-1-1 Notify system via dedicated telephony line or network connection.

All incoming ANIs are compared to the System Subscriber Database. Reaction to negative matches results in "routing to ground" (i.e., deletion) of the particular ANI to which no match was found. Positive reaction (i.e., incoming ANI matched to existing ANI in the System Subscriber Database) results in the system accessing the matched subscriber's registration data record using a translation of the calling ANI as an index to a table.

4.5.3 Wireless Network

There are a number of places in the path of a wireless 9-1-1 call where the call may be recognized, as set forth in the following subsections.

4.5.3.1 Public Switched Telephone Network (PSTN)

Under the system used most commonly today, a wireless 9-1-1 call is sent from the MSC through the PSTN to a PSAP. Here, the call may be recognized at the point it is received at the MSC, when the MSC directs the call to an access tandem, or when the call is directed to the PSAP. It may also be recognized at any point in the call setup process, such as queries to the Face Code Identification Form FCI), Home Location Register (HLR), Visited Location Register (VLR), the Authentication Center (AC), or the Equipment Identity Register (EIR), or at the Operation Maintenance Center (OMC).

4.5.3.2 Cell Tower/Sector Routing

The wireless network may be capable of sending a pseudo-ANI (pANI), Emergency Services Routing Key (ESRK), or Emergency Services Routing Digit (ESRD) for use by tandem switches, and these may be used for call-recognition as well. These may be carried through Feature Group D or SS7 trunks.

4.5.3.3 Handset-Location based routing

With wireless location determination capability, additional points of call recognition and alert signal origination are available. For example: (1) Call-Path Associated Signaling (CAS); (2) Non Call-Path Associated Signaling (NCAS); (3) Hybrid Systems; and (4) third-party location. Each method is described below.

4.5.3.3.1 Call-Path Associated Signaling (CAS)

In this method of recognition, call information (e.g. the ANI, ESRK, ESRD) is sent along with the voice. The recognition occurs either at the Mobile Switching Center/Wireless Switch of the Cellular Provider, at the E911 selective router, at the Position Determining Equipment (PDE) (or Location-Determination Technology), at the Mobile Position Center (MPC), or at the point of query of the ALI database.

4.5.3.3.2 Non Call-Path Associated Signaling (NCAS)

In this method, recognition occurs at point when a location systems, a location-determination technology vendor (LDT) block (206), shown in FIG. 1, locates and/or sends the location information; when the ALI database is updated by the LDT vendor database with the location of the caller; when the E911 selective router queries the ALI database for routing information (ESN, Emergency Services Number); or at the point at which the PSAP queries the ALI database.

4.5.3.3.3 Hybrid Systems

Hybrid systems use features of both Call-Path Associated Signaling (CAS) and Non Call-Path Associated Signaling (NCAS) described above.

4.5.3.3.4 Third-Party Location

In this method of recognition location information is sent to a Web site or other third-party location, to be accessed by (or pushed to) the PSAP. This type of system may be employed as an interim step in upgrading the information the PSAPs have. Since most PSAPs cannot receive map-based data but many have Internet access, an Internet computer is placed alongside the dispatcher's workstation with a map program running that provides location information on wireless 9-1-1 calls. The location may be a GPS location from a Global Positioning System (GPS) infomediary. The recognition takes place at the point information is sent to the infomediary, when it is sent to the Web site, or when it is sent from the Web site to the PSAP.

4.5.4 Internet Protocol (IP) Telephony

For IP telephony calls, the call may be recognized during the server query that occurs during call setup or at the point a location determination database is queried. This can also be accomplished in a Next Generation Network (NGN).

4.6 Real Time Data Acquisition

4.6.1 Voice Recording

For wireline telephony devices, when the ANI is recognized during the ALI database query , this causes the selective router (8) to set up a 3-way call (or other voice-transfer mechanism) to the network, which will terminate in a voice-recording device that will record the call.

When a positive reaction occurs, a signal is sent to the selective router (8) to set up a 3-way call (or other voice-transfer mechanism) to the network (22), which terminates in a voice-recording device that records the call. Alternatively, the selective router may query a selective routing database (ESN database) that is within the selective router, switch, or tandem office. This database may be periodically updated by way of a data link with the System Subscriber Database. The selective router, upon detecting an ANI that matches an entry updated from the System Subscriber Database, will set up the voice transfer and recording routine.

In the AIN environment, upon recognition of the 911 call the SCP will cause the setup of a three-way call or other voice-transfer mechanism recording process that terminates in a voice-recording device that records the call.

The process then uses one or more of the ANI, Time, and Date (or other unique identifying information) to search the voice recording device. A unique identifier (ID) is assigned to the voice recording that will allow it to be identified and played to the notified party. This ID is transferred to and stored in the subscriber record (FIG. 5) in the real-time message (ID) field.

In another alternative method, all 9-1-1 calls routed through the selective router are recorded and stored for a specific length of time. Those voice recordings that are made from a telephone matching the ANI of a customer to the notification service may be retrieved by the notification system network computer upon query to the recording device, which may be located in the 9-1-1 Tandem office or any other location. Those voice recordings not associated with an ANI matching a notification service customer are subsequently deleted.

During the automatic notification subroutine (FIG. 3) when the notify message is played, the real-time message ID in the subscriber record is used to fetch and append the stored voice recording to the outgoing message. The message may be automatically incorporated into the outgoing notify message, as part of the outgoing message, or upon request of the notified party. For example: "The party at 555-1212 called 9-1-1 at 7:15 a.m. today. To hear a recording of the 911 call please press 1 now." "Press 1 to hear again, or 2 to erase".

4.6.2 Computer-Assisted Dispatch Device (CAD) Information Transmission

The software uses one or more of the ANI, Time, and Date (or other unique identifying information) to search the computer-assisted dispatch device (CAD), block 120 shown in FIG. 1, or other emergency response database, whether it be located at the PSAP, in a private ambulance company, in any other private or public service (such as a private security service or alarm company), or as part of a network service. The information is from the CAD or other database is transferred to the 9-1-1 Notify System Subscriber Database (112) where it is stored and associated with a real-time message ID for the subscriber record.

Figure 4:
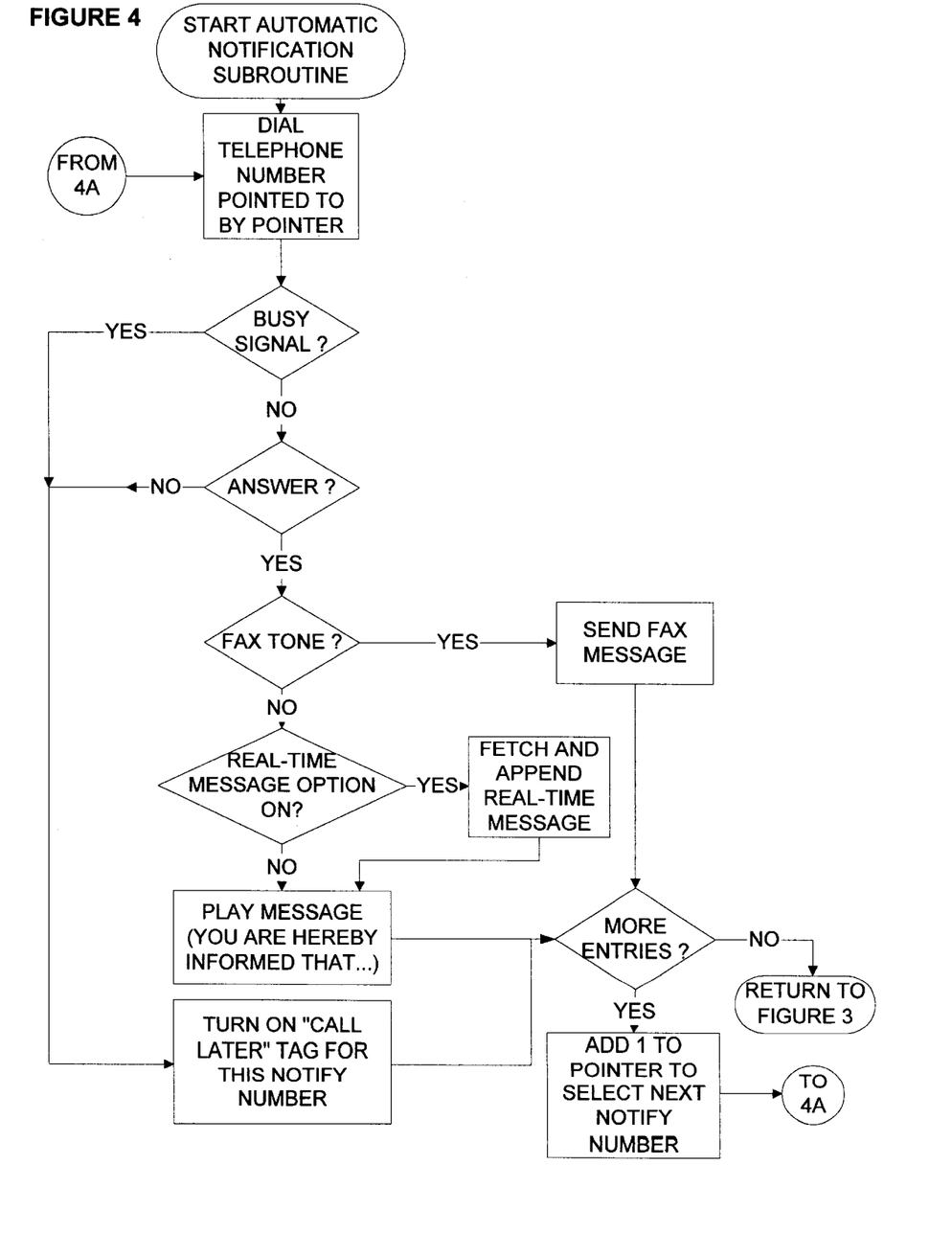
FIG. 4 is a flow chart of the automatic notification subroutine shown in FIG. 3; and, FIG. 5 illustrates an example of a subscriber record for either embodiment, which is stored as an entry in a database.

During the notification mode the information is incorporated into the outgoing notify message that is played, as part of the message, or communicated upon request of the notified party (FIG. 4). So, for example, if someone had a heart attack and was taken to the hospital, the outgoing message might say the "9-1-1 was dialed from 555-1212 at 3:05 PM, the fire department and ambulance were sent to 123 Oak St., and John Doe was taken to St. Elsewhere General, where he arrived at 3:35 PM." Or, for a fire, " . . . engines 7, 8, and 9 were sent to a structure fire"law enforcement emergency, " . . . law enforcement officials were sent and found a domestic dispute".

Some applicable fields that might be provided are: type of emergency, service (law enforcement, fire, and/or ambulance), time dispatched, time arrived, call type, disposition (hospital, cancelled call), time call terminated, time at hospital, and ID of hospital.

4.6.3 Automatic Crash Notification Database

Automobiles equipped with ACN devices will, at the time of a crash, transmit information regarding location, speed, occupants, vehicle identification number (VIN) and vehicle position as well as video. This information is transmitted to the 911 Notify system.

4.7. Notification

4.7.1 Notification Menu Flow

During the automatic notification subroutine (FIG. 4) when the notify message is played, the real-time message ID in the subscriber record is used to fetch and append the stored voice recording to the outgoing message. The message may be incorporated into the outgoing notify message, as part of the message, or be played upon request of the notified party. For example: "The party at 555-1212 called 9-1-1 at 7:15 a.m. today. To hear a recording of the 9-1-1 call please press 1 now." "Press 1 to hear again, or 2 to erase". Information obtained from a CAD or ACN database or other source may be similarly appended.

4.7.2 Attach Associated Information

Once recognized, the wireless or wireline call is associated with additional incident or person/vehicle specific information, such as ship, aircraft, rail, or auto car data (for ACN; CAD data (responders sent, call disposition); a voice recording; and location coordinate or street address.

Figure 5:
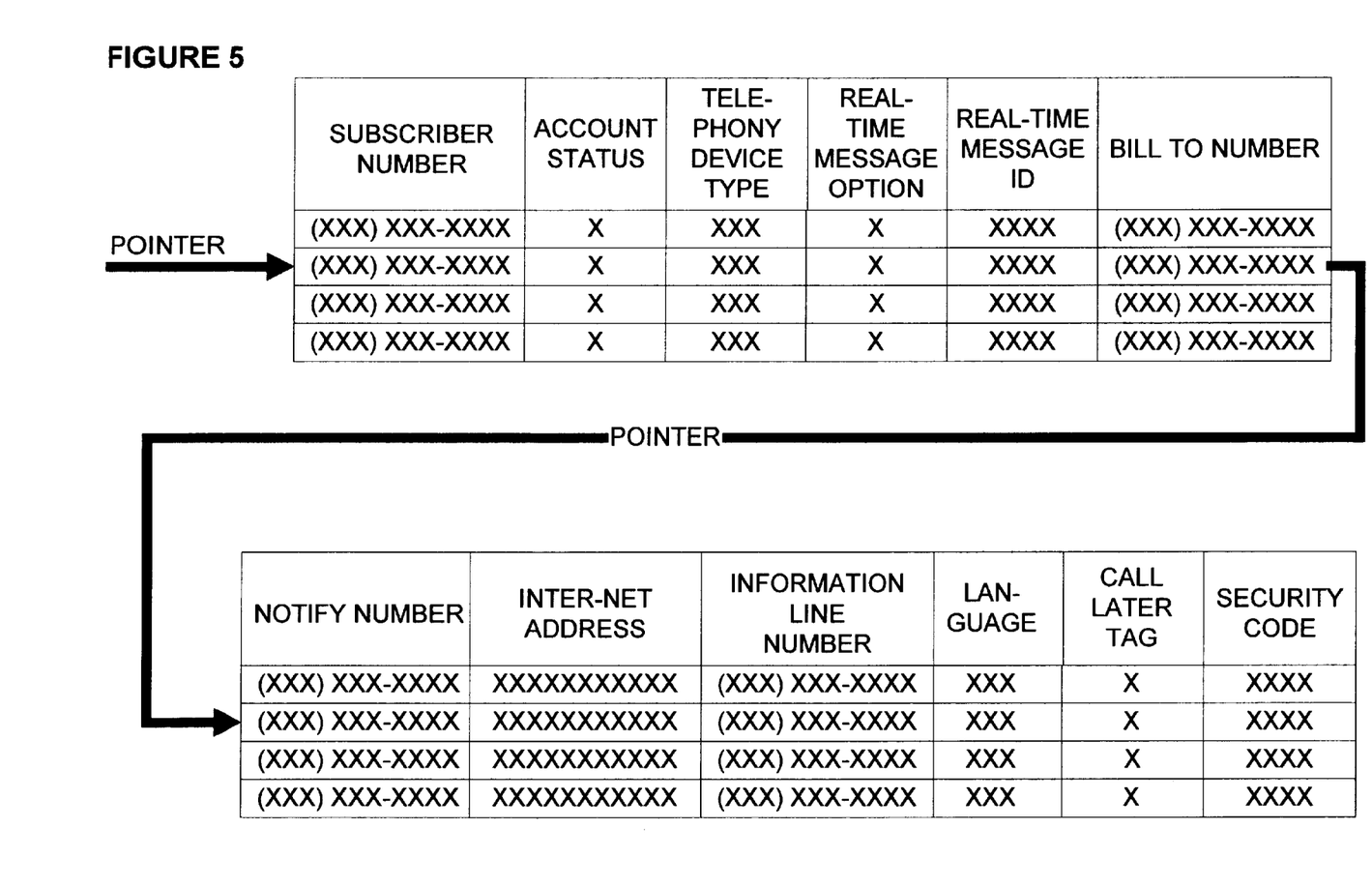

The 9-1-1 Notify system computer shown in FIG. 1 includes one or more interactive voice response (IVR) systems (115) based on the level of traffic that it processes. It also includes a network computer (113) connected to a local area network, which interfaces the IVR and the system subscriber database (112). The system subscriber database is used for the storage of subscriber records, such as billing information and records forming the subscriber's subscription. An example of a subscriber record is shown in FIG. 5, in which a subscriber record includes the subscriber's telephone number, type of telephone (mobile or non-mobile), account status, a list of subscriber-supplied notify number (s), optional subscriber-supplied Internet addresses, an information line associated with each notify number supplied by the emergency call notify service, a field for associated information, a language choice, a call-later tag and a security code.

4.7.3 Notification Mode

The remote system computer includes one or more IVR systems (115) based on the level of traffic that it processes. It also includes a network computer (113) connected to a local area network, which interfaces the IVR systems and the system subscriber database (112). The system subscriber database is used for the storage of subscriber records, such as billing information and records forming the subscriber's subscription. An example of a subscriber record is shown in FIG. 5.

In the notification mode, the system contacts each addressable communication device identified in the subscriber record stored in the system subscriber database (112) and announces (117) that an emergency call was placed from the subscriber's telephone (100).

The computer (113) includes a process capable of interacting with the IVR (115) and the subscriber database (112) such that the process may fetch a subscriber record from the subscriber database in response to receipt of an ANI from the ALI database or AIN that matches an ANI stored in the subscriber database. The process causes a notify message (voice, analog, digital, text, etc.) to be sent to notify numbers stored in the record. The process in the computer may receive in addition to the Automatic Number Identification (ANI) of a caller to a emergency service the number of a Public Service Answering Point (PSAP) to which the emergency call was routed.

The computer (113) may receive over line (109), in addition to the query ANI, associated data, such as subscriber name and subscriber location from the ALI database. In this case, the computer may compose a notify message comprised of a calling phone number derived from the query ANI and additional information derived from data sources including the associated data from the ALI database and other data sources available to the computer, such as time of day, date, etc.

Figure 3:
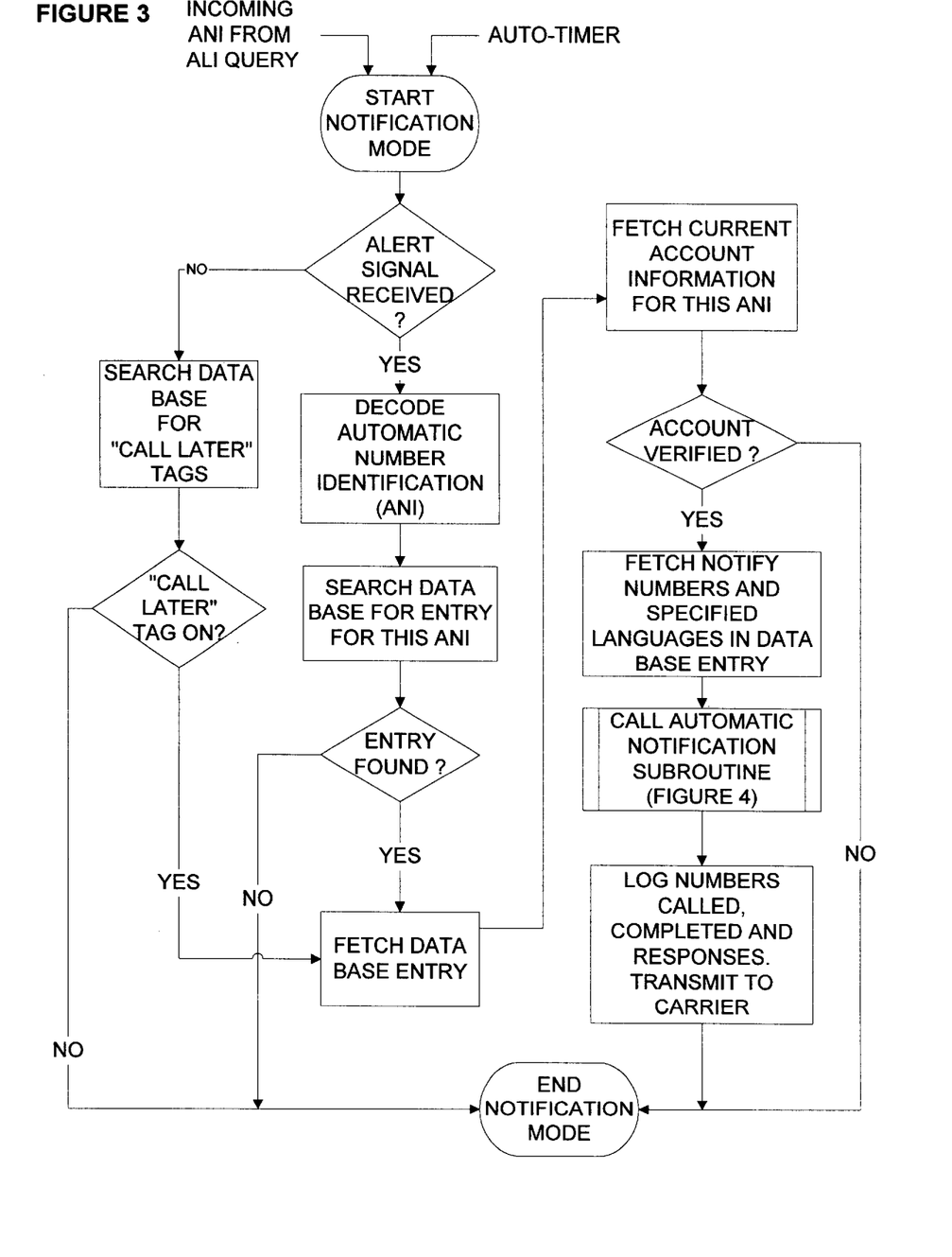
FIG. 3 is a flow chart of the notification software of the present invention.

Refer to FIG. 3, which is a flow chart of the notification software. The start notification mode waits for the ANI of a 9-1-1 query to the ALI database system or other alert signal. When received, the software searches the System Subscriber Database for a matching ANI. If an entry is found, then the software fetches the database entry for this ANI.

Next, the software fetches the notify numbers and specified languages in the database entry for this ANI. The software calls the automatic notification subroutine (FIG. 4). Upon return from the automatic notification subroutine, the software assembles a log of numbers called, calls completed and responses received. The notification mode ends.

When the automatic notification subroutine is invoked, it dials the telephone number(s) as predetermined by the subscriber. If the dialed number is answered, and it is not a fax tone, an E-mail address, etc., the software invokes a notification such as: "(Local telephone company) hereby informs you that 9-1-1 was dialed from telephone number (subscriber's telephone number) at (time) on (day)(date). The subscriber is (subscriber's first name) (subscriber's last name), whose location is (subscriber's location)" or a similar message. If additional information, such as a voice recording or CAD or ACN data, is available, it may be appended to this message or made available to the notified party by option.

If a fax tone is detected, the software branches to send a fax and sends text that reads "telephone number (subscriber's telephone number) dialed 9-1-1 at (time) on (day) (date). The subscriber is (subscriber's first name) (subscriber's last name), whose location is (subscriber's location)" or a similar message. Similarly, the software may send an E-mail or post a text message to an Internet site.

Additional information from a voice recording or CAD may be appended to this message or can be transcribed using automated or human voice transcription, or the text of a TDD conversation may be appended. A telephone number and unique code number to access a voice recording may also be added to this message.

A check is made for more notify number entries in the database. If no, then the flow ends. If yes, the system repeats the above procedure until all notify numbers are acted on. Once the entire subscriber's notify numbers are acted on the process ends. Software routinely searches the database via an auto-timer for "call-later" tags that are set to ON and tries again to successfully complete the notification process.

If the system detects a busy signal it automatically "tags" the particular notify number and attempts to contact the notify number at a predetermined intervals. This process continues until a number of retries is reached that coincides with the providers setting to "time-out" the attempt.

The system repeats the above procedure until all notify numbers are acted on. The software routinely searches the database via an auto-timer for "call-later" tags that are set to ON and tries again to successfully complete the notification process.

The invention has been described with reference to Interactive Voice Response (IVR) systems in the registration and notification modes. It will be understood by those skilled in the art that the exact content of the messages may vary from that as stated herein.

5.0 SUMMARY

What has been described is a new telephone service apparatus and method within a telephone system that provides notification to identified parties that a call to an emergency service has been made from a subscriber number along with information specific to that call. In a first embodiment of the invention wherein telephony devices are hard-wired (wireline), a subscriber number is identifiable by an Automatic Number Identification (ANI), or other unique identifying information, recognized by a query to an Automatic Location Identification (ALI) database or as an Advanced Intelligent Network trigger. In a second embodiment of the invention, wherein telephony devices are mobile (wireless), a subscriber number is identified as an emergency either in the same fashion as a wireline call, in the network path of the wireless call, or in the process of location being supplied by a location-determination technology vendor. An emergency call being recognized results in an alert signal indicating that a call has been placed to the emergency service. The alert signal is used to start the collection of real-time data from message content of the call, the real-time data being collected within an interval between a time that the emergency call is recognized and a response is initiated. The alert signal is used to fetch a subscriber record containing indicia corresponding to the identified parties from a subscriber database; and, a message response system is activated in response to the indicia to thereby initiate notification to the identified parties that a call to the emergency service has been made from a subscriber identified by the alert signal.

According to an aspect of the invention, subscriber data packets are created from subscriber data collected from subscribers as part of the telephone service, for example by the telephone company (104). Each of the subscriber data packets includes a subscriber ANI and may contain other information. A number of subscriber data packets are periodically transferred to the subscriber database (112). At the subscriber database, a number of subscriber data records corresponding to each subscriber ANI are created. As part of a particular subscriber data record are stored a particular ANI, and indicia, such as a particular address of an addressable notify device supplied by a particular subscriber. The particular subscriber data record is subsequently fetched from the subscriber database memory by computer (113) upon a condition that the particular subscriber ANI in the particular subscriber data record matches the ANI (109). The computer (113) utilizes the address of the particular addressable notify device, obtained from the particular subscriber data record, to activate the message response system (115) to thereby place a telephone call to the particular addressable notify device.

The subscriber record is stored as an entry in a database stored in the system subscriber database shown in FIG. 1. The subscriber record includes the subscriber's telephone number, a field that specifies the type of subscriber telephony device (mobile, cell, non-mobile, etc.) a list of subscriber-supplied notify number(s), and one or more of the subscriber's name and address, an account status, subscriber-supplied Internet addresses, an information line associated with a Public Safety Answering Point (PSAP) servicing the subscriber's telephone number, a language choice, a call later tag and a security code. A software pointer selects a record based on a match between a search argument (such as subscriber number, call later tag, etc.) and an entry in one of the corresponding fields of the record.

The computer (113) may receive over line (109), in addition to the ANI, associated data, such as subscriber name and subscriber location from the ALI database. The computer (113) may also receive over line (122) voice and ANI information, and over line (121) CAD or ACN data. In this case, the computer may compose a notify message comprised of a calling phone number derived from the ANI and additional information derived from data sources including the associated data from the ALI database and other data sources available to the computer, such as time of day, date, information number, recorded voice communication, video, CAD data, etc. In addition to voice, video (i.e. from equipped cars or from any video surveillance camera) and graphics (e.g., a map) can be transmitted. Health monitor information may also be included in the additional information in the notification.

The computer (113) includes a process capable of interacting with the IVR (115) and the subscriber database (112) such that the process may fetch a subscriber record from the subscriber database in response to receipt of an ANI from the ALI database that matches an ANI stored in the subscriber database. The process causes a notify message (voice, analog, digital, text, video, etc.) to be sent to notify numbers stored in the record. The process in the computer may receive in addition to the ANI of a caller to a emergency service the number of a Public Service Answering Point (PSAP) to which the emergency call was routed. A storage element in the subscriber record (FIG. 5) in which an ANI of the number of the PSAP to which the emergency call was routed is stored. With this information, the process presents an option to an answering notified party of placing a call to an information telephone station, the ANI of which is stored in the subscriber record. The notified party may be transferred to the information number.

The invention has been described with reference to the use of an alert signal indicating that a call has been placed to the emergency service. This alert signal may be the result of a query ANI to an ALI database, an AIN process, a wireless call detector, CAS, NCAS, Hybrid systems, Web site or other third party locations, or other mechanisms described elsewhere in this specification. Those skilled in the art will understand that other methods of providing an alert signal may be employed to practice the invention.

The invention has been described with reference to the use of telephone devices and the identification of a caller and a notified called station as using telephone devices. It will be understood by those skilled in the art that other devices may be employed to practice the invention. The invention provides notification upon the event that a 9-1-1 call has triggered a query to a local telephone company's Selective Routing/Automatic Location Identification (ALI) database system, when a trigger event is received through an advanced intelligent network, or when the call is recognized during the routing and/or location-information retrieving process of a wireless or IP call.

For wireless devices, this invention has been described with reference to the use of specific networks. It will be understood by those skilled in the art that other network paths and recognition methods may be used.

The invention has been described with reference to Interactive Voice Response (IVR) systems in the registration and notification modes. It will be understood by those skilled in the art that the exact content of the messages may vary from that as stated herein.

The invention has been described with reference to the insertion of real-time informational messages obtained directly from a Computer Assisted Dispatch Device or a voice-recording device. The real-time messages may include actual dispatch information as to what action has been taken by emergency personnel responding to the call. It will be understood by those skilled in the art that the term "real-time" is not limited to messages that are recorded concurrently with the processing of an emergency call but may include messages and information that is created at a time that is prior to or subsequent to the call, and may include information accumulated over a period of time. The messages and information may include any computer, voice, audio, video, or text-based information that may be available at the time a 9-1-1 call occurs that may be used by the notified party to determine the most appropriate response.

The invention has been described with reference to the current non-toll telephone number 9-1-1 designated for calls relating to emergencies that threaten human life or property. It shall be understood by those skilled in the art that the invention can be used with other telephone numbers designated for precise purposes. Examples are the proposed 3-1-1 number for non emergencies in the United States and the 0-6-6 number proposed for emergencies in the country of Mexico.

The term and concept "telephone number" is not intended to be limited to an actual telephone set in the conventional sense. It will be understood that the telephone number or caller ID Automatic Number Identification (ANI) in use today may be replaced by any manifestation that identifies the origination point of a call. With the current blurring of the distinction between televisions, Internet-connected computers, cell phones, pagers, facsimile, etc., there will probably be a more universal ID such as a "Personal Information Address" in use. This Personal Information Address could represent one's phone number, Internet address, etc or other information-transfer device. For purposes of the present invention, the information-transfer device from which the subscription is entered, and the information-transfer device to which the notification that a 9-1-1 call has queried an ALI database system response can be any addressable communication device that can be identified by a unique address.

For example, in the drawings, the notified party is shown as a telephone, whereas it will be understood that any information transfer device will suffice (pager, wireless phone or other wireless communication device, computer, Internet TV, etc.) Also, the registration process is shown as occurring from a telephone, whereas it could come from another medium such as over the Internet or filling out a mail in registration card wherein a clerk enters the information.

By way of another example, as Internet communication and telephony become more popular, the present invention can be practiced there as well. The subscription process can occur over the Internet, the recognition that an Internet telephone 9-1-1 call has occurred can be ascertained, and the delivery of the notification message to an Internet phone or other addressable information device can take place, and may include text, audio, and video messaging.

While the invention has been particularly shown and described with reference to preferred embodiments thereof, it will be understood by those skilled in the art that the foregoing and other changes in form and detail may be made therein without departing from the scope of the invention.

What is claimed is:

1. A telephone service method within a telephone system that provides notification to identified parties that an emergency call to an emergency service has been made from a subscriber, the improvement characterized by:

Receiving an alert signal indicating that a call has been placed to said emergency service;

Collecting real-time data from message content of said call in response to receiving said alert signal;

Said real-time data being collected within an interval between a time that said emergency call is recognized and a response is initiated;

Using said alert signal to fetch a subscriber record containing indicia corresponding to said identified parties from a subscriber database; and, Activating a message response system in response to said indicia to thereby initiate notification to said identified parties that a call to said emergency service has been made from a subscriber identified by said alert signal, said notification including a message comprised of at least part of said real-time data.

2. The method in accordance with claim 1 further characterized by:

Creating subscriber data packets from subscriber data collected from subscribers as part of said telephone service; each of said subscriber data packets including a subscriber unique identifying information;

Periodically transferring a number of subscriber data packets to said subscriber database;

Creating, in said subscriber database, a number of subscriber data records corresponding to each said subscriber unique identifying information;

Storing in a particular subscriber data record a particular subscriber unique identifying information, a particular address of an addressable notify device supplied by a particular subscriber, and said real-time data collected from said message content of said call;

Fetching from said subscriber database memory said particular subscriber data record upon a condition that said particular subscriber unique identifying information in said particular subscriber data record matches said alert signal; and, Utilizing said address of said particular addressable notify device, obtained from said particular subscriber data record, to activate said message response system to thereby send a message to said particular addressable notify device.

3. The method in accordance with claim 1 wherein said subscriber record includes the subscriber's telephone number, a list of subscriber-supplied notify number(s), and a field that identifies said subscriber's telephone number as a wireline or wireless telephone number.

4. The method in accordance with claim 2 wherein said subscriber record includes the subscriber's telephone number, a list of subscriber-supplied notify number(s), and a field that identifies said subscriber's telephone number as a wireline or wireless telephone number.

5. The method in accordance with claim 1 further characterized by:
Receiving, in addition to said alert signal, said collected real-time data from message content of said call;
Composing a notify message comprised of a calling phone number derived from said alert signal and said real-time.

6. The method in accordance with claim 5 wherein said additional information includes the time, date, subscriber name and subscriber location from a location system for wireless calls.

7. The method in accordance with claim 5 further characterized by:
Receiving, in addition to said alert signal, associated data from a location system; and,
Composing a notify message comprised of a calling phone number derived from said alert signal, additional information derived from data sources including said location system, and said real-time data collected from said message content of said call.

8. The method in accordance with claim 7 wherein said additional information includes the time, date, subscriber name and subscriber location obtained from a location system for wireless calls.

9. In a telephone system an apparatus comprising:
An alert signal generated in response to recognition that a call has been placed to an emergency service;
A computer connected to said alert signal;
A process in said computer that collects real-time data from message content of said call in response to receiving said alert signal;
Said real-time data being collected within an interval between a time that said alert signal is received and a response to said call is initiated;
A message response system connected to said computer;
A subscriber database connected to said computer, said subscriber database having a number of subscriber records stored therein;
At least one subscriber record identifying an associated subscriber's subscription to an emergency call notification feature, a subscriber unique identifying information and subscriber supplied information including one or more telephone numbers to be notified;
A process in said computer capable of interacting with said message response system and said subscriber database, a subscriber record being fetched by said process from said subscriber database in response to receipt of unique identifying information from said location system that matches an unique identifying information stored in said subscriber database; and,
A notify message being sent by said message response system, in response to said process, to notify numbers stored in said one subscriber record, said notify message comprised of said calling phone number, said real-time data collected from said message content of said call and additional information supplied by said computer independent of said subscriber supplied information.

10. The apparatus in accordance with claim 9 wherein said additional information includes the time, date, subscriber name and subscriber location of said call obtained from a location system for wireless calls.

11. The apparatus in accordance with claim 9 wherein said subscriber record includes the subscriber's telephone number, a list of subscriber-supplied notify number(s), and a field that identifies said subscriber' telephone number as a wireline or wireless telephone number.

12. A telephone service method within a telephone system that provides notification to identified parties that an emergency call to an emergency service has been made from a subscriber, the improvement characterized by:
receiving an alert signal indicating that a call has been placed to said emergency service;
collecting real-time data from message content of said call in response to receiving said alert signal;
said real-time data being collected within an interval between a time that said emergency call is recognized and a response is initiated;
using said alert signal to fetch a subscriber record containing indicia corresponding to said identified parties from a subscriber database;
activating a message response system in response to said indicia to thereby initiate notification to said identified parties that a call to said emergency service has been made from a subscriber identified by said alert signal;
receiving, in addition to said alert signal, said collected real-time data from message content of said call;
composing a notify message comprised of a calling phone number derived from said alert signal, said real-time data and additional information derived from data sources;
said associated data including the number of a Public Service Answering Point (PSAP) to which the emergency call was routed,
presenting to an answering notified party an option of placing a call to an information telephone station, the ANI of which being stored in said subscriber record as said additional information;
placing a call to the information telephone station using said ANI obtained from said subscriber record, upon a condition that a notified party invokes said option; and,
transferring said notified party to said information number.

13. In a telephone system, an apparatus comprising:
an alert signal generated in response to recognition that a call has been placed to an emergency service;
a computer connected to said alert signal;
a process in said computer that collects real-time data from message content of said call in response to receiving said alert signal;
said real-time data being collected within an interval between a time that said alert signal is received and a response to said call is initiated;
a message response system connected to said computer;
a subscriber database connected to said computer, said subscriber database having a number of subscriber records stored therein;
at least one subscriber record identifying an associated subscriber's subscription to an emergency call notification feature, a subscriber unique identifying information and subscriber supplied information including one or more telephone numbers to be notified;
a process in said computer capable of interacting with said message response system and said subscriber database, a subscriber record being fetched by said process from said subscriber database in response to receipt of unique identifying information that matches an unique identifying information stored in said subscriber database;

a notify message being sent by said message response system, in response to said process, to notify numbers stored in said one subscriber record, said notify message comprised of said calling phone number, said real-time data collected from said message content of said call and additional information supplied by said computer independent of said subscriber supplied information; and, a storage element in said subscriber record in which an ANI of the number of a Public Service Answering Point (PSAP) to which the emergency call was routed is stored; and, wherein said process presents to an answering notified party an option of receiving said real-time data collected from said message content of said call, a reference to which being stored in said subscriber record as said additional information.

14. The apparatus in accordance with claim 11 wherein:

responsive to a notified party invoking said option, placing a call to the information telephone station using said ANI obtained from said subscriber record, and transferring said notified party to said information number.

15. A telephone service apparatus within a telephone system in which an automatic message response system provides notification to identified parties that a call to an emergency service has been made from a subscriber number identifiable by unique identifying information, the improvement characterized by:

A computer having stored therein an alert signal indicating that a call has been placed to said emergency service;

A process in said computer that collects real-time data from message content of said call;

Said real-time data being collected within an interval between a time that said alert signal is received and a response to said call is initiated;

A subscriber database connected to said computer, said subscriber database having stored therein a subscriber record containing indicia corresponding to said identified parties;

Said subscriber record being fetched to said computer from said subscriber database in response to said alert signal; and, said computer having stored therein, in addition to said alert signal, said collected real-time data from message content of said call;

A message response system connected to said computer, said message response system being activated in response to said indicia to thereby initiate notification to said identified parties that a call to said emergency service has been made from a subscriber number identified by said alert signal said notify message being comprised of a calling phone number derived from said alert signal and said collected real-time data.

16. The apparatus in accordance with claim 15 further characterized by:

Said subscriber database having stored therein subscriber data packets containing subscriber data collected from subscribers as part of said telephone service;

Each of said subscriber data packets including a subscriber unique identifying information;

Said subscriber database containing a number of subscriber data records corresponding to each said subscriber unique identifying information;

A particular subscriber data record having stored therein a particular subscriber unique identifying information, and a particular address of an addressable notify device supplied by a particular subscriber;

Said computer having stored therein a particular subscriber data record fetched from said subscriber database upon a condition that said particular subscriber unique identifying information in said particular subscriber data record matches said alert signal; and, Said indicia contained in said subscriber record being said address of said particular addressable notify device, obtained from said particular subscriber data record.

17. The apparatus in accordance with claim 15 wherein said emergency service includes a Public Safety Answering Point (PSAP) connected to said location database, the improvement further characterized by:

A data path between said PSAP and said computer;

Said alert signal being transferred from said PSAP over said data path between said PSAP and said computer in response to a call placed to said PSAP.

18. The apparatus in accordance with claim 17 wherein said subscriber record includes the subscriber's telephone number, a list of subscriber-supplied notify number(s), and one or more of the subscriber's name and location, an account status, subscriber-supplied Internet addresses, an information line associated with a Public Safety Answering Point (PSAP) servicing the subscriber's telephone number, a language choice, a call later tag and a security code.

19. The apparatus in accordance with claim 15 further characterized by:

Said computer having stored therein, in addition to said alert signal, associated data received from a location system;

Said notify message comprised of a calling phone number derived from said alert signal and additional information derived from data sources including said location system.

20. The apparatus in accordance with claim 19 wherein said additional information includes the time, date, subscriber name and subscriber location obtained from a location system for wireless calls.

21. The apparatus in accordance with claim 17 further characterized by:

a location system;

Said computer having stored therein, in addition to said alert signal, associated data received from said location system;

Said notify message comprised of a calling phone number derived from said alert signal and additional information derived from data sources including said location system.

22. The apparatus in accordance with claim 21 wherein said additional information includes the time, date, subscriber name and subscriber location obtained from a location system for wireless calls.

23. In a telecommunications network including an emergency call center that detects an emergency call and a notify component, a method comprising:

A. Using said notify component to search an emergency response database resulting in additional associated information;

B. Transferring said additional associated information from said emergency response database to an emergency call notification service subscriber database; and, C. Incorporating said additional associated information into an outgoing notify message;

said additional associated information of step A including real-time incident and response information that is collected within an interval between a time that an emergency call is detected by said emergency call center and a time that said additional associated information is incorporated into an outgoing notify message in step C.

24. The method of claim 23 wherein said additional associated information is obtained from a voice-recording device.

25. The method of claim 23 wherein said additional associated information is obtained from at least one of a computer assisted dispatch device and an Automatic Crash Notification database.

26. In a telecommunications system having at least one subscriber device in a telephone network, a method of notifying at least one designated telephone number that an emergency telephone call has been made from the subscriber device, comprising steps of:

A. recognizing an emergency call initiated from said subscriber device at a detection point along a network path within said telephone network;

B. generating additional information including real-time incident and response information, said real-time data being collected within an interval between a time that said alert signal is received and a response to said call is initiated;

C. associating said emergency call with said additional information separate from information in said emergency call; and, D. automatically sending a message to an addressable communications device designated by said subscriber, said message including said additional information.

27. The method of claim 26 wherein said real-time incident and response information includes the location of said subscriber device obtained from a location system, and one or more of incident specific information, person specific information, and vehicle specific information.

28. A telephone service method within a telephone system, which provides notification to identified parties that a call to an emergency service has been made from a subscriber number identifying a subscriber device, the improvement characterized by:

A. detecting a call placed to said emergency service from said subscriber device;

B. updating a subscriber record in a subscriber database with additional information including one or more of incident specific information, person specific information, and vehicle specific information;

C. using unique identifying information to fetch a subscriber record containing indicia corresponding to said identified parties from a subscriber database; and, D. activating a message response system in response to said indicia to thereby initiate notification to said identified parties that a call to said emergency service has been made from a subscriber number identified by said unique identifying information;

said additional information of step B including real-time incident and response information that was collected within an interval between a time that said call is detected in step A and activating a message response system in step D.

* * * * *